United States Patent
Adachi

(10) Patent No.: US 7,973,653 B2
(45) Date of Patent: Jul. 5, 2011

(54) VEHICULAR ABNORMALITY NOTIFICATION SYSTEM, METHOD AND APPARATUS, AND VEHICLE-MOUNTED APPARATUS

(75) Inventor: Akito Adachi, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 715 days.

(21) Appl. No.: 11/634,260

(22) Filed: Dec. 6, 2006

(65) Prior Publication Data

US 2007/0126559 A1    Jun. 7, 2007

(30) Foreign Application Priority Data

Dec. 7, 2005   (JP) ................................ 2005-353132

(51) Int. Cl.
*B60Q 1/00*    (2006.01)
(52) U.S. Cl. .................... 340/438; 340/500; 340/988
(58) Field of Classification Search ............... 340/425.5, 340/438, 443, 439, 988, 901, 933, 500, 501, 340/286.01
See application file for complete search history.

(56) References Cited

U.S. PATENT DOCUMENTS

| | | | | |
|---|---|---|---|---|
| 5,373,282 A | * | 12/1994 | Carter | 340/5.3 |
| 5,550,551 A | * | 8/1996 | Alesio | 342/457 |
| 5,559,493 A | * | 9/1996 | Karnwie-Tuah | 340/426.36 |
| 5,587,715 A | * | 12/1996 | Lewis | 342/357.03 |
| 6,433,677 B1 | * | 8/2002 | Flick | 340/426.22 |
| 6,791,456 B2 | * | 9/2004 | Nakayama et al. | 340/429 |
| 7,017,400 B2 | * | 3/2006 | Grell | 73/114.01 |
| 2002/0093419 A1 | * | 7/2002 | Nakayama et al. | 340/426 |
| 2002/0097152 A1 | * | 7/2002 | Mengrone et al. | 340/571 |
| 2003/0109972 A1 | * | 6/2003 | Tak | 701/29 |

FOREIGN PATENT DOCUMENTS

| | | |
|---|---|---|
| JP | 2001-14575 | 1/2001 |
| JP | 2001-342889 | 12/2001 |
| JP | 2002-152828 | 5/2002 |
| JP | 2002-260125 | 9/2002 |
| JP | 2003-285720 | 10/2003 |
| JP | 2003-291751 | 10/2003 |
| JP | 2005-041437 | 2/2005 |
| JP | 2005-41438 | 2/2005 |
| JP | 2005-182281 | 7/2005 |

OTHER PUBLICATIONS

Japanese Office Action dated Jun. 10, 2008.

* cited by examiner

*Primary Examiner* — George A Bugg
*Assistant Examiner* — Edny Labbees
(74) *Attorney, Agent, or Firm* — Finnegan, Henderson, Farabow, Garrett & Dunner, LLP

(57) ABSTRACT

An apparatus, a method and a system of vehicle abnormality notification in which predetermined information is transmitted to a predetermined subject when an abnormality in the vehicle state is detected in a vehicle are constructed so that even when an abnormality in the vehicle state has been detected in the vehicle, the aforementioned predetermined information is not transmitted to the predetermined subject if the vehicle is in a predetermined area.

25 Claims, 4 Drawing Sheets

- MAP INFORMATION
  (LOCATION DATA OF DEALER, ETC.)
- AUTO SERVICE INFORMATION MAIL

VEHICULAR ABNORMALITY NOTIFICATION SYSTEM, METHOD AND APPARATUS, AND VEHICLE-MOUNTED APPARATUS

INCORPORATION BY REFERENCE

The disclosure of Japanese Patent Application No. 2005-353132 filed on Dec. 7, 2005 including the specification, drawings and abstract is incorporated herein by reference in its entirety.

BACKGROUND OF THE INVENTION

1. Field of the Invention

The invention generally relates to a vehicular abnormality notification system that detects an abnormality in the state of a vehicle, and notifies it to a vehicle driver. More particularly, the invention relates to vehicular abnormality notification system, method and apparatus and a vehicle-mounted apparatus in which unnecessary notifications to the vehicle are prevented from being transmitted.

2. Description of the Related Art

A vehicular abnormality notification system that detects an abnormality in the state of a vehicle and notifies it to a vehicle driver is known (e.g., see Japanese Patent Application Publication No. 2005-182281).

Japanese Patent Application Publication No. 2005-182281 discloses a system in which when a vehicle-mounted apparatus mounted in a vehicle detects an abnormality in the state of the vehicle, the vehicle-mounted apparatus transmits the abnormality information to a center, and the center transmits to the vehicle-mounted apparatus a mail informing of the occurrence of an abnormality and recommending that the vehicle be put into a service plant (hereinafter, simply referred to as "auto service information mail").

However, in the system disclosed in Japanese Patent Application Publication No. 2005-182281, even the removal of an ECU, a sensor, an actuator, etc., for the purpose of repair, maintenance, checking, or vehicle inspection or test at a repair plant of a dealer or the like is detected as an abnormality in the state of the vehicle, and the auto service information mail is transmitted.

The system disclosed in the Japanese Patent Application Publication No. 2005-182281 is designed so that the auto service information mail based on the same abnormality information is not transmitted again until a predetermined time elapses following the transmission of the auto service information mail, or until the amount of change in the state of the vehicle becomes greater than a set value. However, this technique cannot prevent the initial transmission of the auto service information mail to the vehicle-mounted apparatus even in the case of authorized repair or the like as mentioned above.

There may be conceived a technique in which a switch that prohibits transmission of an abnormality detection report from the vehicle-mounted apparatus to the center is provided in the vehicle-mounted apparatus in such a manner that only experts are able to operate the switch, and at the time of authorized repair or the like, a person in charge of the repair is requested to operate the switch. However, such a technique dependent on human labor cannot remove the possibility of forgetting to perform the operation. Besides, at unaffiliated repair plants or the like, a person in charge of the repair may not be aware of the existence of the switch itself.

SUMMARY OF THE INVENTION

It is a main object of the invention to provide vehicular abnormality notification system, method and apparatus and a vehicle-mounted apparatus in which the transmission of unnecessary notifications to a vehicle is prevented.

A first aspect of the invention is a vehicle abnormality notification apparatus that transmits predetermined information to a predetermined subject when an abnormality in a vehicle state is detected in a vehicle, wherein even when an abnormality in the vehicle state is detected in a subject vehicle, the predetermined information is not transmitted to a predetermined subject if the subject vehicle is in a predetermined area.

In the first aspect, the predetermined information is, for example, a message that notifies of occurrence of an abnormality and/or recommends repair or checking at a repair plant or the like, etc. Besides, the predetermined subject is, for example, a display in the cabin of the vehicle, or a driver or an owner of the vehicle. If an abnormality is detected in a subject vehicle, the predetermined information is transmitted, for example, in the form of electronic mail, to a multi-medium appliance mounted in the vehicle, a pre-registered vehicle driver's cell phone or stationary communication terminal.

Furthermore, in the first aspect, the predetermined area is at least one region where maintenance of a vehicle is performed, and comprehensively refers to places where repair, checking and maintenance of vehicles are performed, for example, repair plants/service plants of motor vehicle dealers, etc.

According to the first aspect, it is judged that the occurrence of abnormality that is detected when the vehicle is in a predetermined area is due to a change in the vehicle state caused by an authorized operation of repairs, checking or the like, and so an auto service information mail is not transmitted. Therefore, transmission of unnecessary mails is avoided, and the communication cost is also reduced.

Besides, according to the first aspect, if the vehicle is in a predetermined area, transmission of the auto service information mail is automatically prevented. Therefore, the vehicle driver or a person in charge of the repair is saved a trouble of operating a switch for prohibiting the transmission of the auto service information mail from the vehicle-mounted apparatus to the center, and there is no possibility of forgetting to operate the switch.

In addition, in the first aspect, it is preferable that a high-accuracy GPS, for example, the RTK (Real Time Kinematic)-GPS (Global Positioning System) or the like, be used for detecting the position of the vehicle in which an abnormality in the vehicle state has been detected.

A second aspect of the invention is a vehicle-mounted apparatus which is mounted in a vehicle, and which communicates with a vehicle abnormality notification apparatus that transmits predetermined information to a predetermined subject when an abnormality in a vehicle state is detected in the vehicle, and which transmits abnormality occurrence information to the vehicle abnormality notification apparatus when an abnormality is detected in the vehicle state of a host vehicle, wherein even when an abnormality in the vehicle state is detected in a host vehicle, the vehicle-mounted apparatus does not transmit the abnormality occurrence information to the vehicle abnormality notification apparatus if the host vehicle is in a predetermined area.

In the second aspect, the predetermined information is, for example, a message that notifies of occurrence of an abnormality and/or recommends repair or checking at a repair plant or the like, etc. Besides, the predetermined subject is, for example, a display in the cabin of the vehicle, or a driver or an owner of the vehicle. If an abnormality is detected in a vehicle, the predetermined information is transmitted, for example, in the form of electronic mail, to a multi-medium appliance mounted in the host vehicle, a pre-registered host vehicle driver's cell phone or stationary communication terminal.

Furthermore, in the second aspect, the predetermined area is at least one region where maintenance of a vehicle is performed, and comprehensively refers to places where repair, checking and maintenance of vehicles are performed, for example, repair plants/service plants of motor vehicle dealers, etc.

According to the second aspect, it is judged that the occurrence of abnormality that is detected when the vehicle is in a predetermined area is due to a change in the vehicle state caused by an authorized operation of repairs, checking or the like, and so abnormality occurrence information is not transmitted to the vehicle abnormality notification apparatus. Therefore, transmission of unnecessary data is avoided, and the communication cost is also reduced.

Furthermore, according to the second aspect, if the vehicle is in a predetermined area, transmission of abnormality occurrence information is automatically prevented. Therefore, a vehicle driver is saved a trouble of operating a switch for prohibiting the transmission of the abnormality occurrence information from the vehicle-mounted apparatus to the center, and there is no possibility of forgetting to operate the switch.

In addition, in the second aspect, it is preferable that a high-accuracy GPS, for example, the RTK-GPS or the like, be used for detecting the position of the host vehicle.

A third aspect of the invention is a vehicular abnormality notification system in which predetermined information is transmitted from a predetermined communication apparatus to a predetermined subject when an abnormality in a vehicle state is detected in the vehicle, wherein the vehicular abnormality notification system includes: determination portion that determines whether or not the vehicle in which an abnormality in the vehicle state has been detected is in a predetermined area; and message transmission prohibition portion that prevents the predetermined information from being transmitted from the predetermined communication apparatus to the predetermined subject when it is determined by the determination portion that the vehicle in which an abnormality in the vehicle state has been detected is in the predetermined area.

In the third aspect, the predetermined information is, for example, a message that notifies of occurrence of an abnormality and/or recommends repair or checking at a repair plant or the like, etc. Besides, the predetermined subject is, for example, a display in the cabin of the vehicle, or a driver or an owner of the vehicle. If an abnormality is detected in the vehicle, the predetermined information is transmitted, for example, in the form of electronic mail, to a multi-medium appliance mounted in the vehicle, a pre-registered vehicle driver's cell phone or stationary communication terminal.

Furthermore, in the third aspect, the predetermined area is at least one region where maintenance of a vehicle is performed, and comprehensively refers to places where repair, checking and maintenance of vehicles are performed, for example, repair plants/service plants of motor vehicle dealers, etc.

According to the third aspect, it is judged that the occurrence of abnormality that is detected when the vehicle is in a predetermined area is due to a change in the vehicle state caused by an authorized operation of repairs, checking or the like, and so an auto service information mail is not transmitted. Therefore, transmission of unnecessary mails is avoided, and the communication cost is also reduced.

Besides, according to the third aspect, if the vehicle is in a predetermined area, transmission of an auto service information mail is automatically prevented. Therefore, the vehicle driver or a person in charge of the repair is saved a trouble of operating a switch for prohibiting the transmission of the auto service information mail from the vehicle-mounted apparatus to the center, and there is no possibility of forgetting to operate the switch.

In addition, in the third aspect, it is preferable that a high-accuracy GPS, for example, the RTK-GPS or the like, be used for detecting the position of the vehicle in which an abnormality in the vehicle state has been detected.

According to the foregoing aspects of the invention, it is possible to provide vehicular abnormality notification system, method and apparatus and a vehicle-mounted apparatus in which the transmission of unnecessary notifications to a vehicle is prevented.

Best modes for carrying out the invention will be described below, with embodiments being presented with reference to the drawings. Basic concepts of a system in which an auto service information mail is transmitted to a vehicle driver when an abnormality is detected in the vehicle and a main hardware construction thereof as well as its operation principles, basic control techniques, etc., are already known to those with ordinary skill in the art, and detailed descriptions of minute technologies thereof will not be given herein.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

With reference to FIGS. 1 to 5, a vehicular abnormality notification system in accordance with an embodiment of the invention will be described.

Firstly, with reference to FIG. 1, an overall construction of a vehicular abnormality notification system 100 in accordance with the embodiment will be described.

The vehicular abnormality notification system 100 in accordance with the embodiment is constructed of a vehicle-mounted apparatus 101 mounted in a vehicle V, and a center 102 that is a communication station, for example, managed and run by a service business unit, such as a vehicle manufacture, a motor vehicle retailer, a specialized vendor, etc., and that is a vehicle abnormality notification apparatus that notifies a driver of the vehicle V of occurrence of an abnormality.

The vehicle-mounted apparatus 101 and the center 102 are constructed so as to be able to communicate with each other through the use of wireless communication. The communication connection between the vehicle-mounted apparatus 101 and the center 102 is not limited to a direct connection but may also be a communication connection via vehicle-to-vehicle communication, road-to-vehicle communication, and/or satellite communication.

Figure 1:
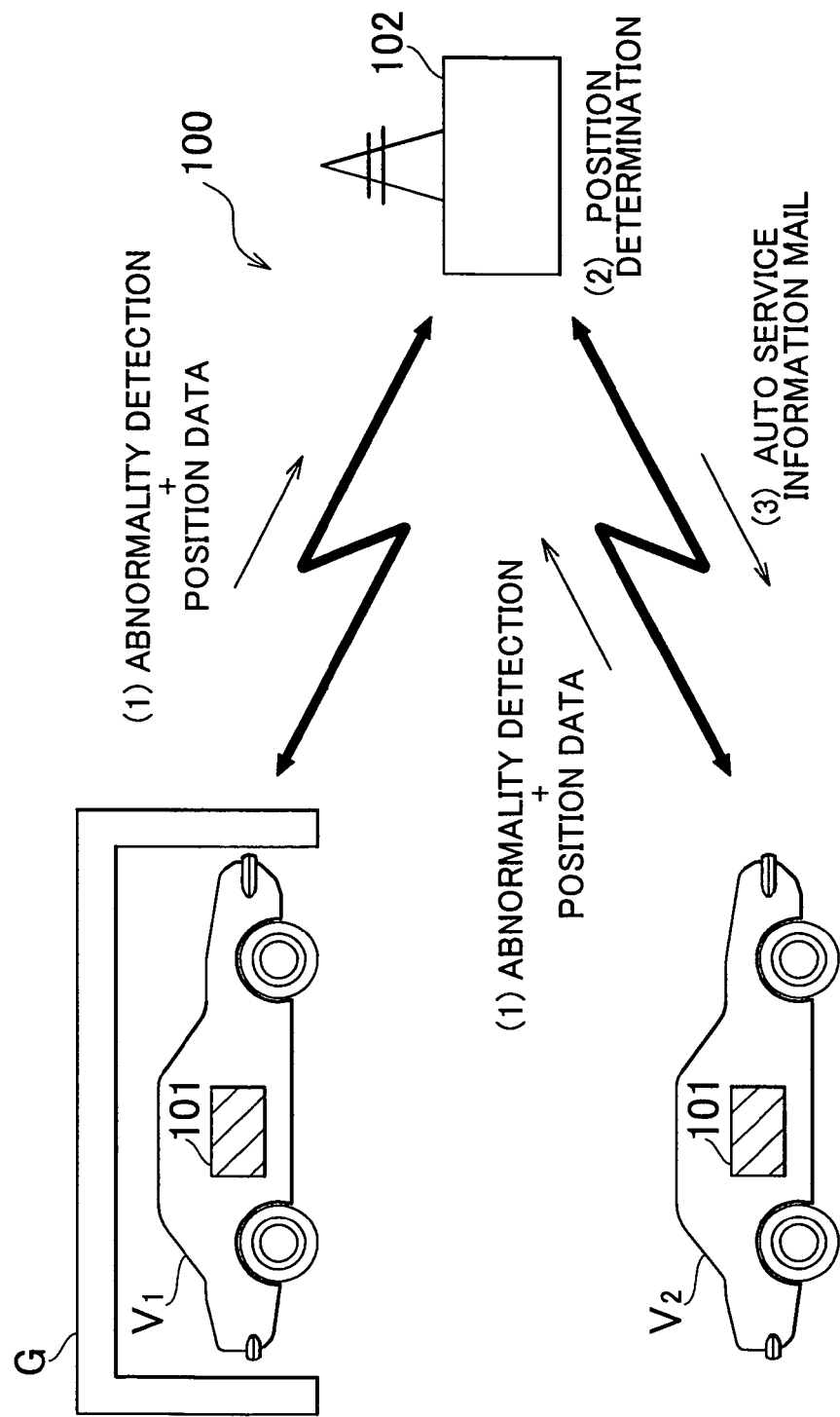
FIG. 1 is a schematic construction diagram of a vehicular abnormality notification system in accordance with an embodiment of the invention.

Although FIG. 1 shows only two vehicles V, that is, $V_1$ and $V_2$, for convenience, it is naturally assumed that the center 102 in accordance with the embodiment is capable of performing processings with regard to three or more vehicles V in parallel, and the center 102 is capable of connecting for communication with three or more vehicles V.

Basic actions of the whole system will be generally described. Firstly, if an abnormality in the vehicle state is detected in the vehicle V, the vehicle-mounted apparatus 101 uploads information regarding the detection together with host vehicle position information to the center 102. The center 102 estimates whether or not the detected abnormality has been caused by an authorized repair or the like. If the center 102 judges that it is not a repair or the like that has caused the abnormality and it is necessary to give a notification to the vehicle driver, the center 102 transmits to the vehicle-mounted apparatus 101 of the vehicle V a mail that informs of the occurrence of an abnormality and that recommends that the vehicle V be put into a shop G for vehicle repair, checking and maintenance, such as repair plants/service plants of motor vehicle dealers and the like (hereinafter, simply referred to as "dealer or the like G") (which will hereinafter be simply referred to as "auto service information mail").

In this embodiment, if the vehicle V is in the dealer or the like G (in the ground thereof), the center 102 judges that the detection of occurrence of an abnormality has resulted from a change in the vehicle state caused by an operation involved in the repair, checking or the like of the vehicle, and does not transmit the auto service information mail.

Figure 2:
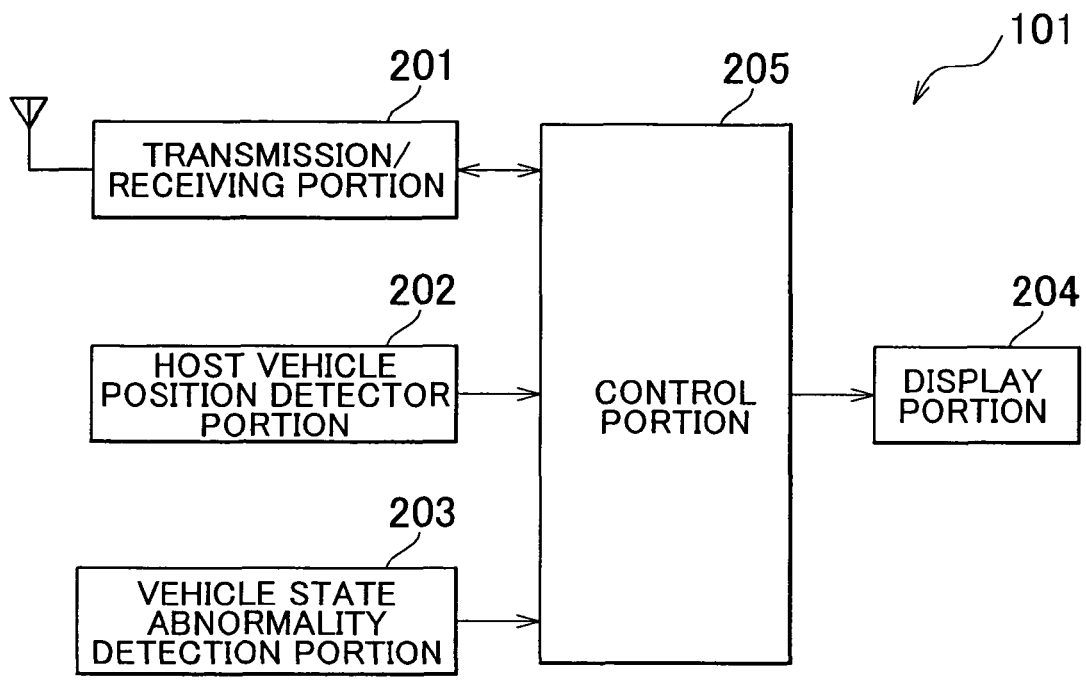
FIG. 2 is a schematic construction diagram of a vehicle-mounted apparatus in the vehicular abnormality notification system in accordance with the embodiment of the invention.

FIG. 2 is a schematic construction diagram of the vehicle-mounted apparatus 101 that is mounted in the vehicle V for communicating with the center 102.

The vehicle-mounted apparatus 101 has a transmitter/receiver portion 201 for transmitting information to and receiving information from the center 102 through the use of wireless communication. The communication method adopted is arbitrary; for example, a cell phone network may be used. Besides, the communication connection between the transmitter/receiver portion 201 and the center 102 is not limited to a direct connection but may also be a communication connection via vehicle-to-vehicle communication, road-to-vehicle communication, and/or satellite communication.

The vehicle-mounted apparatus 101 further has a host vehicle position detector portion 202 that detects the position of the vehicle V, for example, through the use of a GPS. As for the detection accuracy (resolution) of the host vehicle position detector portion 202, the higher (finer) is the more preferable. For example, it is preferable to use a high-accuracy GPS such as the RTK-GPS or the like.

The vehicle-mounted apparatus 101 further has a vehicle state abnormality detector portion 203 that detects an abnormality in the vehicle state. In the embodiment, the vehicle state abnormality detector portion 203 is connected with various ECUs of the vehicle V via an in-vehicle LAN such as the CAN (controller area network) or the like. By the self-diagnostic function, the vehicle state abnormality detector portion 203 checks the states of action of processors, sensors, etc., and, if a fault or the like is detected, produces a warning and records it as a diagnostic code.

The vehicle-mounted apparatus 101 further has a display portion 204 that visually presents at least character information to a user. The display portion 204 includes a display, for example, a small-size LCD (liquid crystal display) integrated with or independent of the instrument panel, an overhead display exploiting hologram virtual images, etc.

The vehicle-mounted apparatus 101 further has a control portion 205 that centrally controls various component elements of the vehicle-mounted apparatus 101. The control portion 205 is, for example, an ECU (electronic control unit or device).

Figure 3:
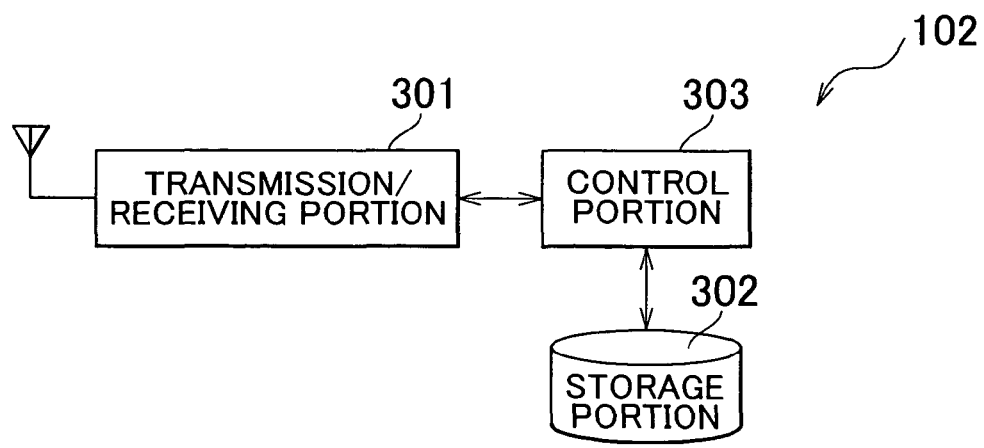
FIG. 3 is a schematic construction diagram of a vehicle abnormality notification apparatus (center) in the vehicular abnormality notification system in accordance with the embodiment of the invention.

FIG. 3 is a schematic construction diagram of a center (vehicle abnormality notification apparatus) 102 that transmits an auto service information mail to the driver of the vehicle V through the use of communication when an abnormality has occurred in the vehicle V.

The center 102 has a transmitter/receiver portion 301 for transmitting information to and receiving information from the vehicle-mounted apparatus 101. The communication method adopted herein is arbitrary; for example, a cell phone network may be used. Besides, the communication connection between the transmitter/receiver portion 301 and the vehicle-mounted apparatus 101 is not limited to a direct connection but may also be a communication connection via vehicle-to-vehicle communication, road-to-vehicle communication, and/or satellite communication.

The center 102 further has a storage portion 302 in which map information, including information regarding the locations of dealers and the like in particular, is stored beforehand and in which character information that presents auto service information mails is stored as fixed phrases. In the embodiment, the storage portion 302 may be an arbitrary storage medium. Besides, it is preferable that the map information stored in the storage portion 302 be updated to the latest data, for example, through the use of communication, when appropriate.

The center 102 further has a control portion 303 that centrally controls various component elements of the center 102. The control portion 303 is, for example, an ECU.

Figure 4:
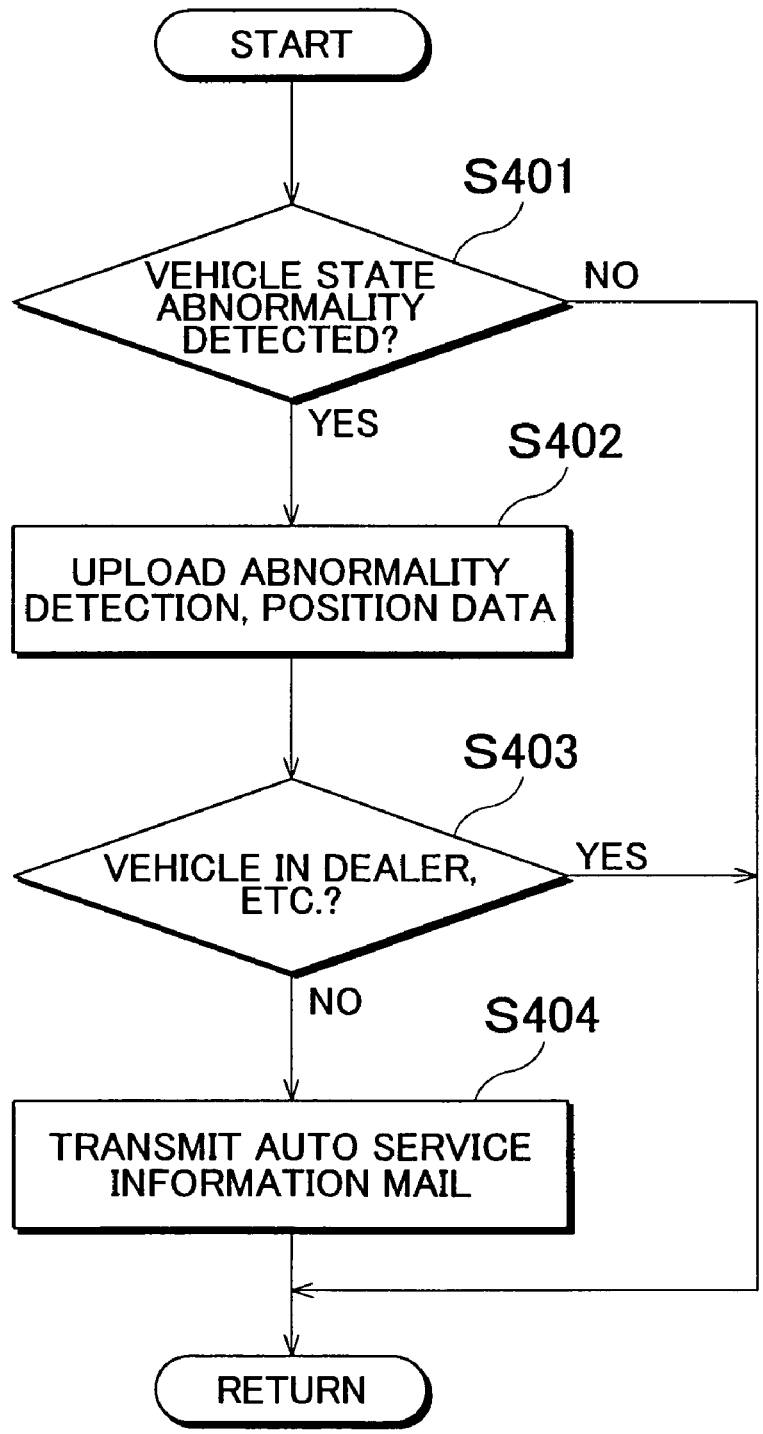
FIG. 4 is a flowchart showing the flow of a vehicular abnormality notification process in the vehicular abnormality notification system in accordance with the embodiment of the invention.

Next, with reference to the flowchart of FIG. 4, actions of the vehicle-mounted apparatus 101 and the center 102 in this embodiment will be described in detail.

First, the control portion 205 of the vehicle-mounted apparatus 101 monitors a detection result provided by the vehicle state abnormality detector portion 203 (S401). If an abnormality in the vehicle state is detected (YES at S401), the control portion 205 transmits a warning or a diagnostic code provided as a result of the detection, together with the position information of the vehicle V detected by the host vehicle position detector portion 202, to the center 102 via the transmitter/receiver portion 201 (S402).

The control portion 303 of the center 102, upon receiving a correspondence indicating that an abnormality has been detected in the vehicle state together with the position information from the vehicle-mounted apparatus 101 via the transmitter/receiver portion 302, determines whether or not the vehicle V is in the ground of a dealer or the like by comparing the position information with the map information stored in the storage portion 302 (S403).

If the map information stored in the storage portion 302 includes the location of the dealer or the like only in the form of coordinate values, and thus does not allow a grasp of minute ground regions, the control portion 303 may determine whether or not the vehicle V is in the ground of the dealer or the like on the basis of whether or not the position coordinate of the vehicle V is within a circle of a predetermined radius about the position coordinate of the dealer or the like.

If it is determined that the vehicle V is not in the ground of the dealer or the like (NO at S403), the control portion 303 of the center 102 extracts an auto service information mail from the storage portion 302, and transmits it to the vehicle-mounted apparatus 101 of the vehicle V via the transmitter/receiver portion 301, as a usual operation (S404).

Upon receiving the auto service information mail from the center 102 via the transmitter/receiver portion 201, the control portion 205 of the vehicle-mounted apparatus 101 causes the received mail to be displayed to the vehicle driver via the display portion 204.

On the other hand, if it is determined that the vehicle V is in the ground of the dealer or the like (YES at S403), the control portion 303 of the center 102 judges that a change in the vehicle state has been caused by an operation of repair, checking or the like at the dealer or the like, and has been detected as occurrence of an abnormality, that is, judges that transmission of an auto service information mail is not necessary, and therefore does not transmit an auto service information mail to the vehicle V (S404 skipped).

Thus, according to this embodiment, if an abnormality is detected when the vehicle is at a dealer or the like, it is judged that the occurrence of abnormality is due to a change in the vehicle state caused by an authorized operation of repairs, checking or the like, and therefore an auto service information mail is not transmitted. Hence, transmission of unnecessary mails is avoided, and the communication cost is reduced.

Besides, according to the embodiment, since transmission of an auto service information mail is automatically prevented during repair, checking or maintenance, the vehicle driver or a person in charge of the repair is saved a trouble of operating a switch for prohibiting the transmission of the auto service information mail from the vehicle-mounted apparatus 101 to the center 102, and there is no possibility of forgetting to operate the switch.

In addition, in the foregoing embodiment, if the vehicle V whose abnormality has been detected is in the ground of a dealer or the like, it is determined that the detected abnormality is a mere proper change caused by an operation of repair, checking or the like (i.e., transmission of an auto service information mail is not necessary). This is based on an insight that it should be very rare that while a user is visiting a dealer or the like about a matter other than repair, checking or the like, the vehicle state changes and a new abnormality is detected. Should such an event occur, the prohibition of transmission of an auto service information mail will be removed automatically and promptly when the user drives the vehicle out of the dealer or the like, so that an auto service information mail will be transmitted to the user. Thus, it is considered that there is not any trouble.

Besides, possible methods in which the center 102 more carefully determines whether or not the vehicle V is undergoing an operation of repair, checking or the like while a relatively easy technique is employed are, for example:

A) a design is made such that the center 102 is able to obtain the auto service reservation schedule of the vehicle V, and such that only when the vehicle position is in the ground of the dealer or the like and the date and hour matches the auto service reservation schedule, an auto service information mail is not transmitted even if an abnormality is detected;

B) a design is made such that the vehicle-mounted apparatus 101 also detects the vehicle speed of the vehicle V, and uploads the vehicle speed to the center 102, and such that only when the vehicle position is in the ground of a dealer or the like and the vehicle speed of the vehicle V is zero, an auto service information mail is not transmitted even if an abnormality is detected;

C) a design is made such that the vehicle-mounted apparatus 101 detects whether or not the smart entry key is present in the vehicle cabin, and uploads a result of detection to the center 102, and such that only when the position of the vehicle V is in the ground of a dealer or the like and the key is not present in the cabin, an auto service information mail is not transmitted even if an abnormality is detected;

D) a design is made such that the vehicle-mounted apparatus 101 detects the presence/absence of the sitting of a human on the driver's seat, and uploads a result of the detection to the center 102, and such that only when the position of the vehicle V is in the ground of a dealer or the like and no one is sitting on the driver's seat, an auto service information mail is not transmitted even if an abnormality is detected;

E) a design is made such that only when the vehicle V has changed its stopped position at least a predetermined number of times within the ground of a dealer or the like, an auto service information mail is not transmitted even if an abnormality is detected; or F) in a combination of arbitrary ones of the foregoing methods, an auto service information mail may not transmitted even if an abnormality is detected.

Furthermore, although the foregoing embodiment is described in conjunction with the case where the estimation or determination as to whether or not the vehicle whose abnormality has been detected is undergoing a proper operation of repair, checking or the like at a dealer of the like is performed in the center 102 through the use of position information, the determination may be performed in the vehicle.

Figure 5:
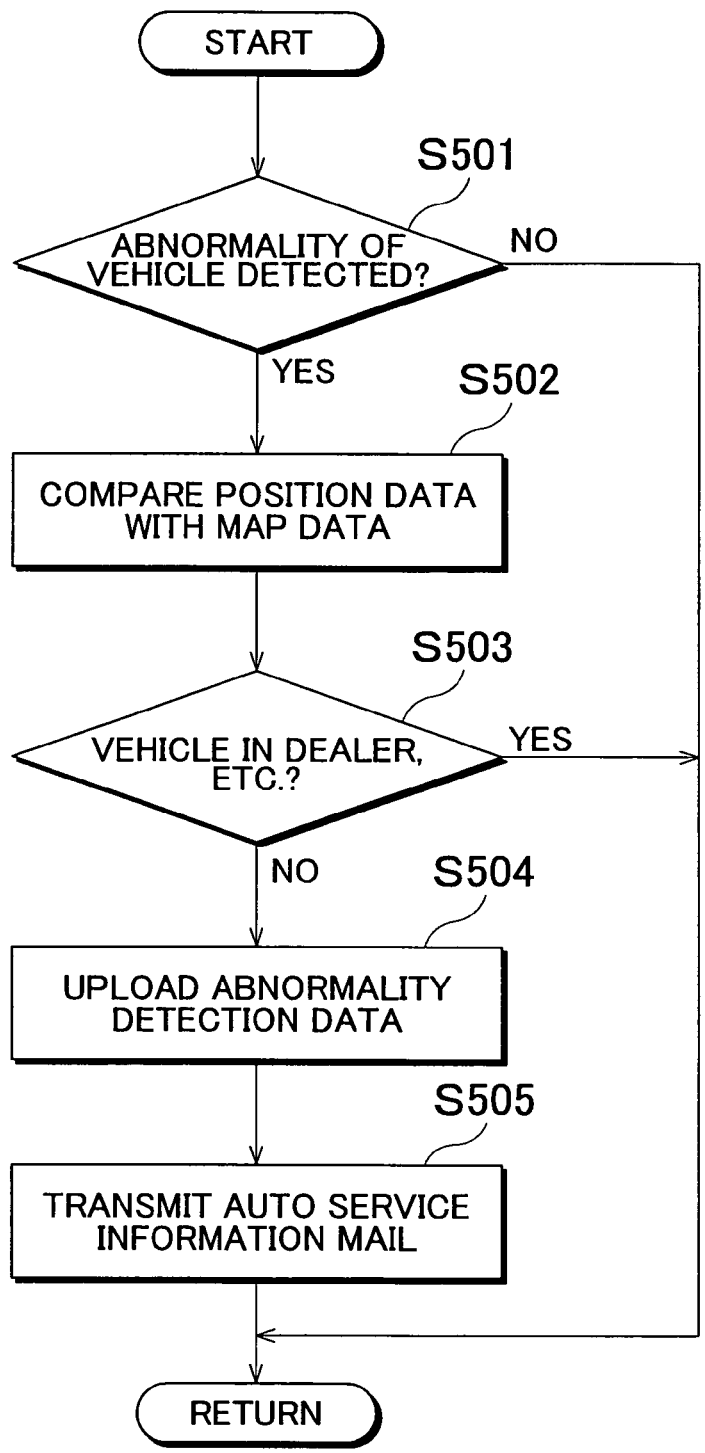
FIG. 5 is a flowchart showing the flow of a vehicular abnormality notification process in a vehicular abnormality notification system in accordance with another embodiment of the invention.

With reference to the flowchart of FIG. 5, details of the action of the vehicle-mounted apparatus 101 in the case where the determination regarding the vehicle position is performed in the vehicle will be described.

The control portion 205 of the vehicle-mounted apparatus 101 monitors a detection result provided by the vehicle state abnormality detector portion 203 (S501). If an abnormality in the vehicle state is detected (YES at S501), the control portion 205 determines whether or not the vehicle V is in the ground of a dealer or the like by comparing the position information of the vehicle V detected by the position detector portion 202 with the map data stored in the control portion 205 (S502).

If the map information stored in the control portion 205 includes the location of the dealer or the like only in the form of coordinate values, and thus does not allow a grasp of minute ground regions, the control portion 205 may determine whether or not the vehicle V is in the ground of the dealer or the like on the basis of whether or not the position coordinate of the vehicle V is within a circle of a predetermined radius about the position coordinate of the dealer or the like. Furthermore, the control portion 205 may also utilize map data from a car navigation system (not shown) connected thereto.

If it is judged that the vehicle V is not in the ground of the dealer or the like (NO at S503), the control portion 205 uploads the abnormality detection data to the center 102 via the transmitter/receiver portion 201 (S504).

On the other hand, it is determined that the vehicle V is in the ground of the dealer or the like (YES at S503), the control portion 205 judges that a change in the vehicle state has been caused by an operation of repair, checking or the like at the dealer or the like, and has been detected as occurrence of an abnormality, that is, judges transmission of an auto service information mail is not necessary, and therefore ends the process (S504 and S505 skipped).

In this case, besides the avoidance of transmission of an auto service information mail from the center 102 to the vehicle V with an abnormality, the upload of an abnormality occurrence report (position information) from the vehicle V to the center 102 is avoided; therefore, the communication cost is further reduced in comparison with the case where the determination of the vehicle position is performed at the center 102.

In the case where the determination as to whether or not the host vehicle is undergoing an operation of repair, checking or the like is performed on the vehicle side, it is also permissible that the vehicle-mounted apparatus 101 be designed so that the apparatus 101 capable of detecting whether or not a tool used for an operation of repair, checking or the like, for example, a service tool for reading a diagnostic code, or the like, is connected to the vehicle V, and so that while such a tool is connected to the vehicle V, the control portion 205 does not send a correspondence about abnormality occurrence (together with the position information) to the center 102 even if an abnormality is detected by the vehicle state abnormality detector portion 203.

The invention can be utilized in a system in which if an abnormality is detected in a vehicle, an auto service information mail is transmitted to the driver of the vehicle. The external appearance, the weight, the size, the traveling performance, etc., of a vehicle to which the invention is applied are not concerned.

What is claimed is:

1. A vehicle fault notification apparatus, comprising:
a receiving portion configured to receive fault occurrence information regarding a vehicle fault, the fault occurrence information being received from the vehicle;
a control portion configured to determine a position of the vehicle and configured to determine, without manual input from a vehicle operator, whether the vehicle is in a region where vehicle maintenance is performed;
a transmission portion configured to transmit predetermined information to a predetermined subject when the receiving portion receives the fault occurrence information; and
wherein when the control portion has determined that the vehicle is in the region where vehicle maintenance is performed, the control portion prevents, without manual input from the vehicle operator, the transmission of the predetermined information to the predetermined subject.

2. The vehicle fault notification apparatus according to claim 1, further comprising a storage portion that stores map data together with information regarding the region where vehicle maintenance is performed,
wherein the control portion determines whether or not the vehicle is in the region where vehicle maintenance is performed based on the map data stored in the storage portion.

3. The vehicle fault notification apparatus according to claim 1, wherein the predetermined subject is a display in a cabin of the vehicle, or a driver or an owner of the vehicle.

4. A vehicle mounted apparatus comprising:
a fault detection portion configured to detect a vehicle fault;
a control portion configured to determine, without manual input from a vehicle operator, whether the vehicle is in a predetermined area; and
a transmission portion configured to transmit fault occurrence information to a terminal provided outside the vehicle when the fault detection portion detects the vehicle fault,
wherein when the control portion determines that the vehicle is in the predetermined area, the control portion prevents, without manual input from the vehicle operator, the transmission of the fault occurrence information; and
wherein the predetermined area is a region where maintenance of a vehicle is performed.

5. The vehicle-mounted apparatus according to claim 4, further comprising:
a vehicle position detection portion that detects a position of the vehicle;
wherein the control portion is configured to store map data together with information regarding the region where vehicle maintenance is performed, and
wherein the control portion compares the vehicle position information with the map data to determine whether or not the vehicle is in the region where vehicle maintenance is performed.

6. A vehicular fault notification system comprising:
a vehicle fault detection portion configured to detect a vehicle fault;
a control portion configured to determine, without manual input from a vehicle operator, whether a vehicle is in a predetermined area;
a communication apparatus configured to transmit fault occurrence information to a predetermined subject when the vehicle fault is detected; and
a determination transmission prohibition portion that prevents, without manual input from the vehicle operator, the fault occurrence information from being transmitted from the communication apparatus to the predetermined subject when the control portion determines that the vehicle is in the predetermined area;
wherein the predetermined area is a region where maintenance of a vehicle is performed.

7. The vehicular fault notification system according to claim 6, wherein the predetermined subject is a display in a cabin of the vehicle, or a driver or an owner of the vehicle.

8. A vehicle fault notification method comprising:
receiving fault occurrence information regarding a vehicle fault, the fault occurrence information being received from the vehicle;
determining a position of the vehicle when the fault occurrence information is received;
determining, without manual input from a vehicle operator, whether the vehicle is in a region where vehicle maintenance is performed;
transmitting the fault occurrence information to a predetermined subject if it is determined that the vehicle is not in the region where vehicle maintenance is performed; and
preventing, without manual input from the vehicle operator, transmission of the fault occurrence information to the predetermined subject when it is determined that the vehicle is in the region where vehicle maintenance is performed.

9. A vehicle fault notification method comprising:
monitoring presence/absence of a vehicle fault;
determining, without manual input from a vehicle operator, whether or not the vehicle is in a predetermined area;
determining whether or not the vehicle is in the predetermined area when the vehicle fault is detected;

transmitting fault occurrence information to a predetermined subject when it is determined that the vehicle is not in the predetermined area; and prohibiting, without manual input from the vehicle operator, the fault occurrence information from being transmitted to the predetermined subject when it is determined that the vehicle is in the predetermined area, wherein the predetermined area is a region where vehicle maintenance is performed.

10. A vehicle fault notification method comprising:
monitoring presence/absence of a vehicle fault;
determining, without manual input from a vehicle operator, whether or not the vehicle is in a predetermined area;
determining whether or not the vehicle is in the predetermined area when the vehicle fault is detected;
transmitting fault occurrence information to a predetermined subject when it is determined that the vehicle is not in the predetermined area; and
prohibiting, without manual input from a vehicle operator, the fault occurrence information from being transmitted to the predetermined subject when it is determined that the vehicle is in the predetermined area,
wherein the predetermined area is a region where vehicle maintenance is performed.

11. The vehicle fault notification apparatus according to claim 1, further comprising a storage portion storing information regarding locations where maintenance of the vehicle is performed.

12. The vehicle fault notification apparatus according to claim 1, further comprising a display portion mounted in the vehicle, the display portion displaying the fault occurrence information.

13. The vehicle fault notification apparatus according to claim 1, wherein the control portion is configured to receive a service reservation schedule of the vehicle.

14. The vehicle fault notification apparatus according to claim 1, wherein the vehicle fault is of a mechanical or electrical system in the vehicle.

15. The vehicle fault notification apparatus according to claim 1,
wherein the control portion is configured to detect a vehicle speed of the vehicle, and
wherein when the control portion has determined that the vehicle is in the region where vehicle maintenance is performed and the vehicle speed is zero, the control portion prevents the transmission of the predetermined information to the predetermined subject.

16. The vehicle fault notification apparatus according to claim 1,
wherein the control portion is configured to detect whether or not a smart entry key is present in a vehicle cabin, and
wherein when the control portion has determined that the vehicle is in the region where vehicle maintenance is performed and the smart entry key is not present in the vehicle cabin, the control portion prevents the transmission of the predetermined information to the predetermined subject.

17. The vehicle fault notification apparatus according to claim 1,
wherein the control portion is configured to detect whether or not a human is sitting on a driver's seat of the vehicle, and
wherein when the control portion has determined that the vehicle is in the region where vehicle maintenance is performed and no one is sitting on the driver's seat, the control portion prevents the transmission of the predetermined information to the predetermined subject.

18. The vehicle fault notification apparatus according to claim 1,
wherein when the control portion has determined that the vehicle is in the region where vehicle maintenance is performed and has detected that the vehicle's stopped position has changed at least a predetermined number of times within the region where vehicle maintenance is performed, the control portion prevents the transmission of the predetermined information to the predetermined subject.

19. The vehicle-mounted apparatus according to claim 4, wherein the fault detection portion has a self-diagnostic function.

20. The vehicle fault notification apparatus according to claim 1, wherein when the control portion has determined that the vehicle enters the region where vehicle maintenance is performed, the control portion prevents the transmission of the predetermined information to the predetermined subject.

21. The vehicle-mounted apparatus according to claim 5, wherein when the control portion has determined that the vehicle enters the region where maintenance of a vehicle is performed, the control portion prevents the transmission of the fault occurrence information.

22. The vehicular fault notification system according to claim 6, wherein when the control portion has determined that the vehicle enters the region where maintenance of a vehicle is performed, the determination transmission prohibition portion prevents the transmission of the fault occurrence information to the predetermined subject.

23. The vehicle fault notification method according to claim 8, further comprising preventing transmission of the fault occurrence information to the predetermined subject when it is determined that the vehicle enters the region where vehicle maintenance is performed.

24. The vehicle fault notification method according to claim 9, further comprising prohibiting the fault occurrence information from being transmitted to the predetermined subject when it is determined that the vehicle enters the region where vehicle maintenance is performed.

25. The fault notification method according to claim 10, further comprising prohibiting the fault occurrence information from being transmitted to the predetermined subject when it is determined that the vehicle enters the region where vehicle maintenance is performed.

* * * * *